May 11, 1965  A. M. MICHALKA  3,182,889
FOLDING BOX
Filed Aug. 15, 1963  8 Sheets-Sheet 1
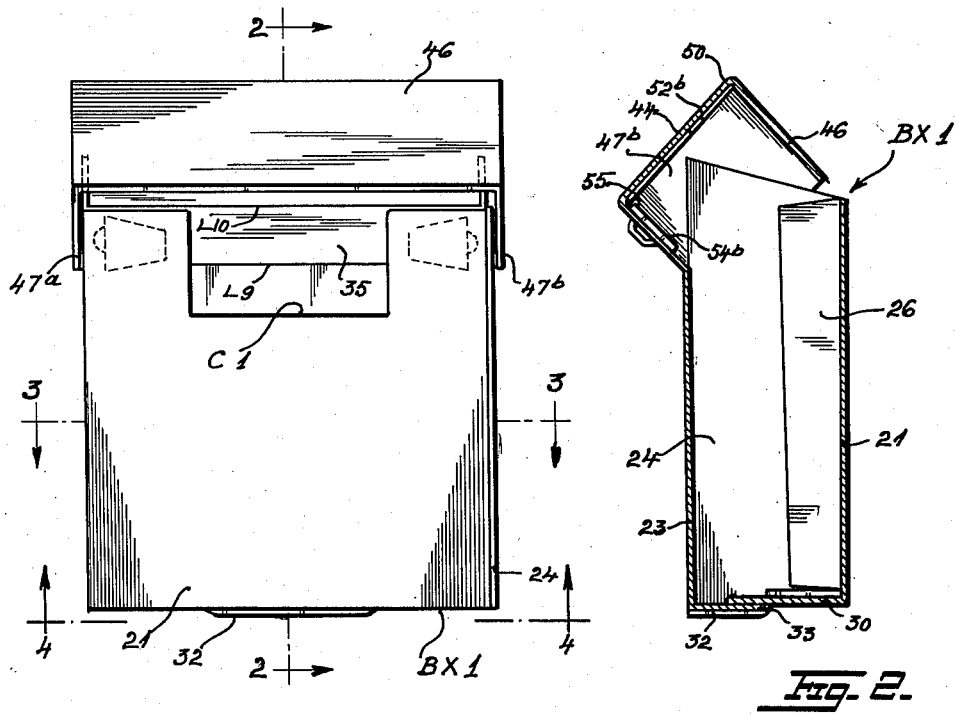
Fig. 1.
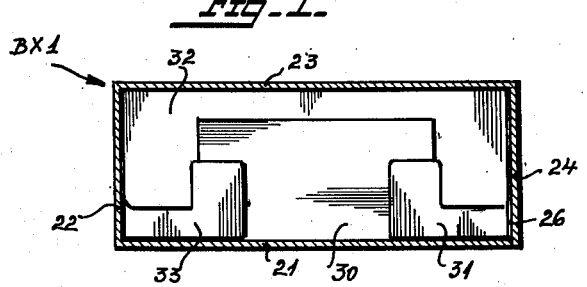
Fig. 3.
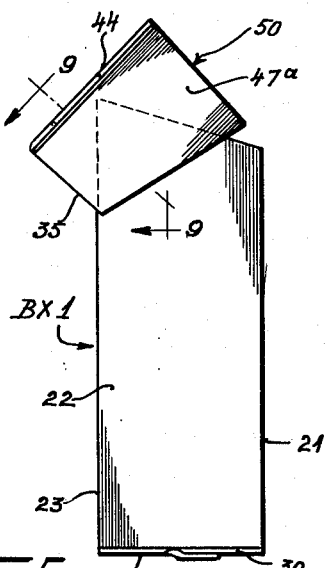
Fig. 5.
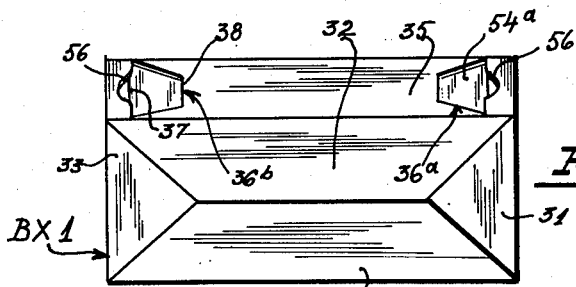
Fig. 4.
INVENTOR.
Alois M. Michalka
BY
ATTORNEYS.

May 11, 1965
A. M. MICHALKA
3,182,889
FOLDING BOX
Filed Aug. 15, 1963
8 Sheets-Sheet 2
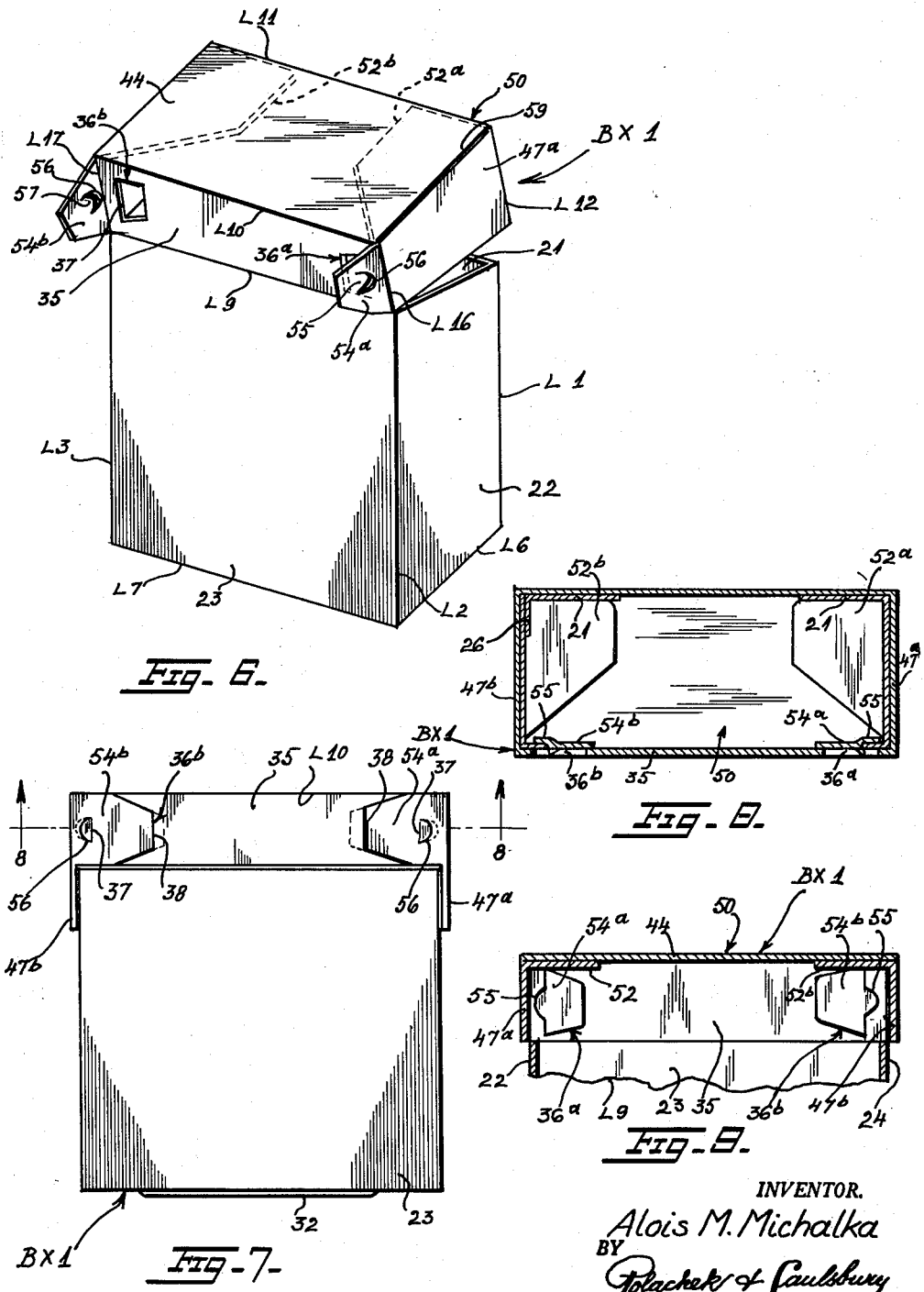
INVENTOR.
Alois M. Michalka
BY
Polachek & Saulsbury
ATTORNEYS.

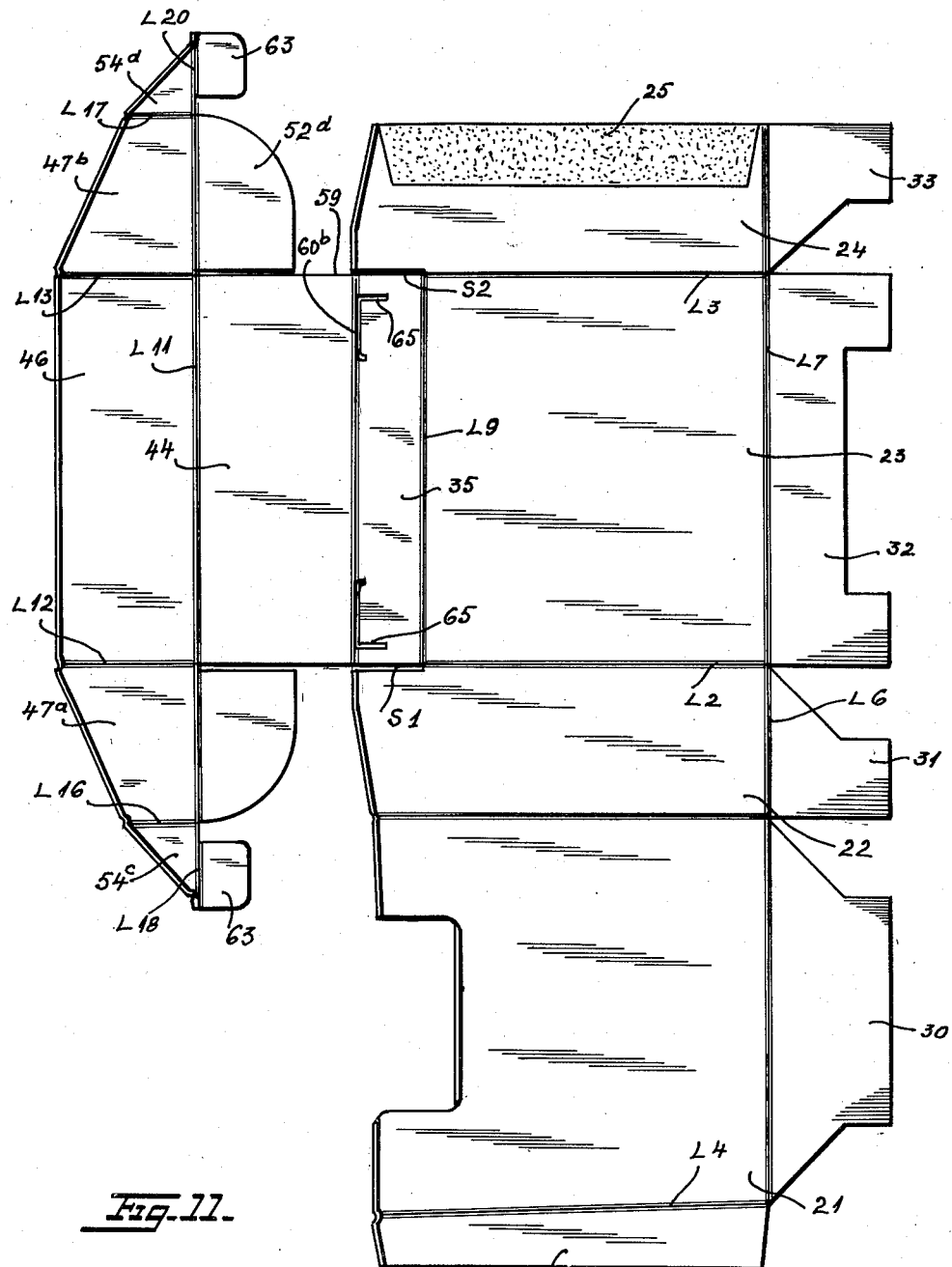

May 11, 1965　　　A. M. MICHALKA　　　3,182,889
FOLDING BOX
Filed Aug. 15, 1963　　　　　　　　　8 Sheets-Sheet 5
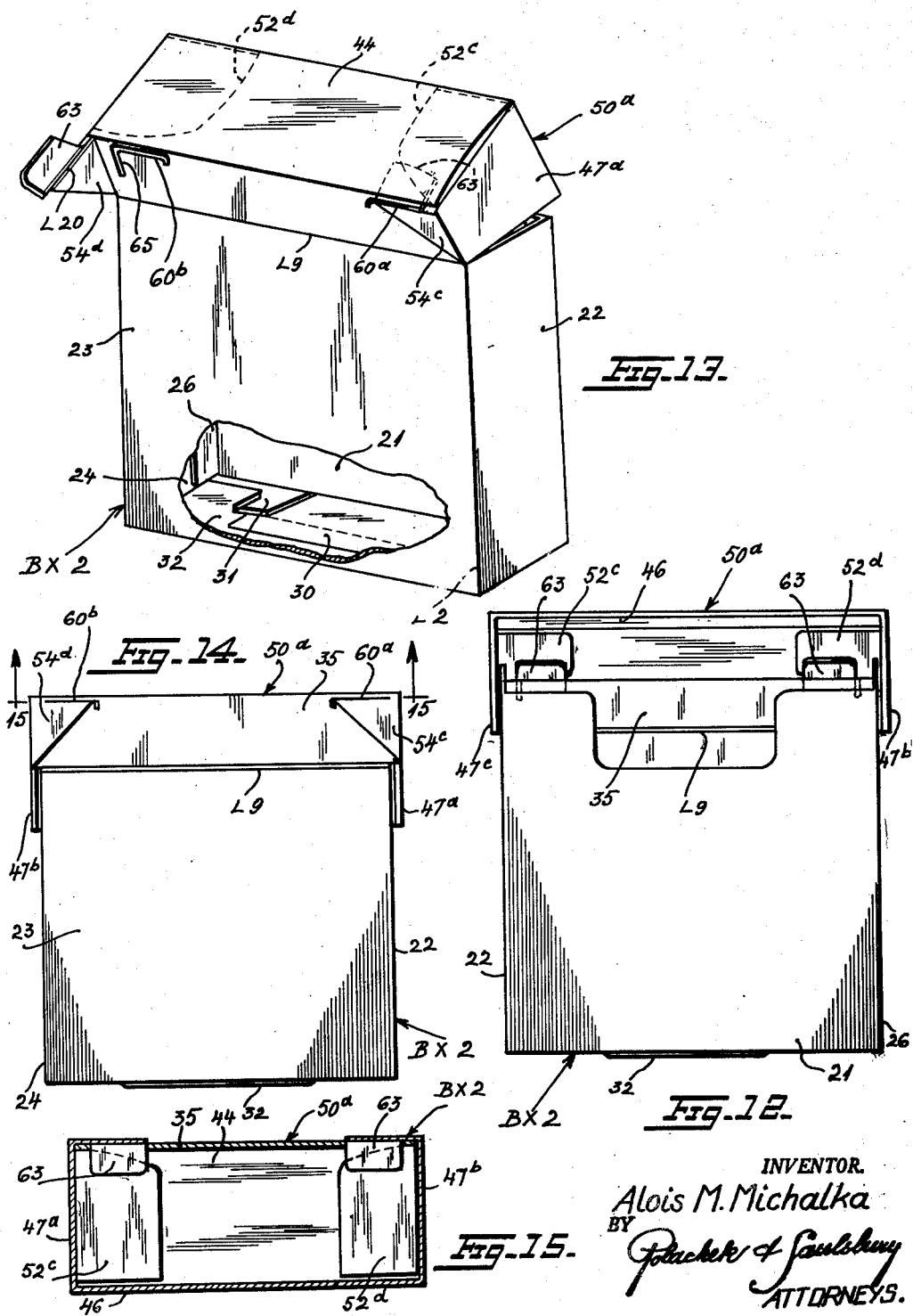
INVENTOR.
Alois M. Michalka
BY
ATTORNEYS.

May 11, 1965 A. M. MICHALKA 3,182,889
FOLDING BOX
Filed Aug. 15, 1963 8 Sheets-Sheet 6
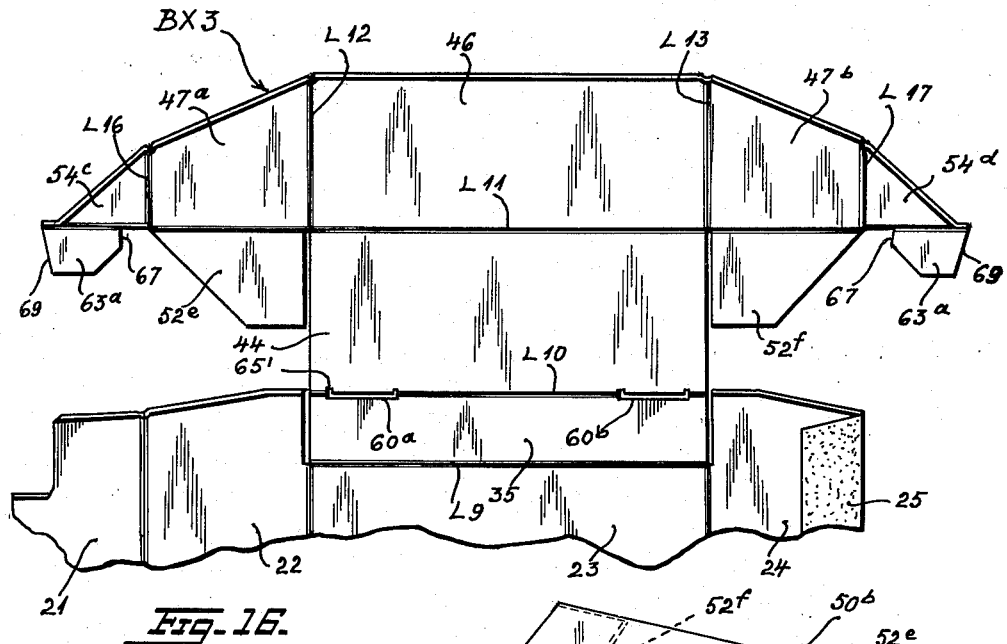
Fig. 16.
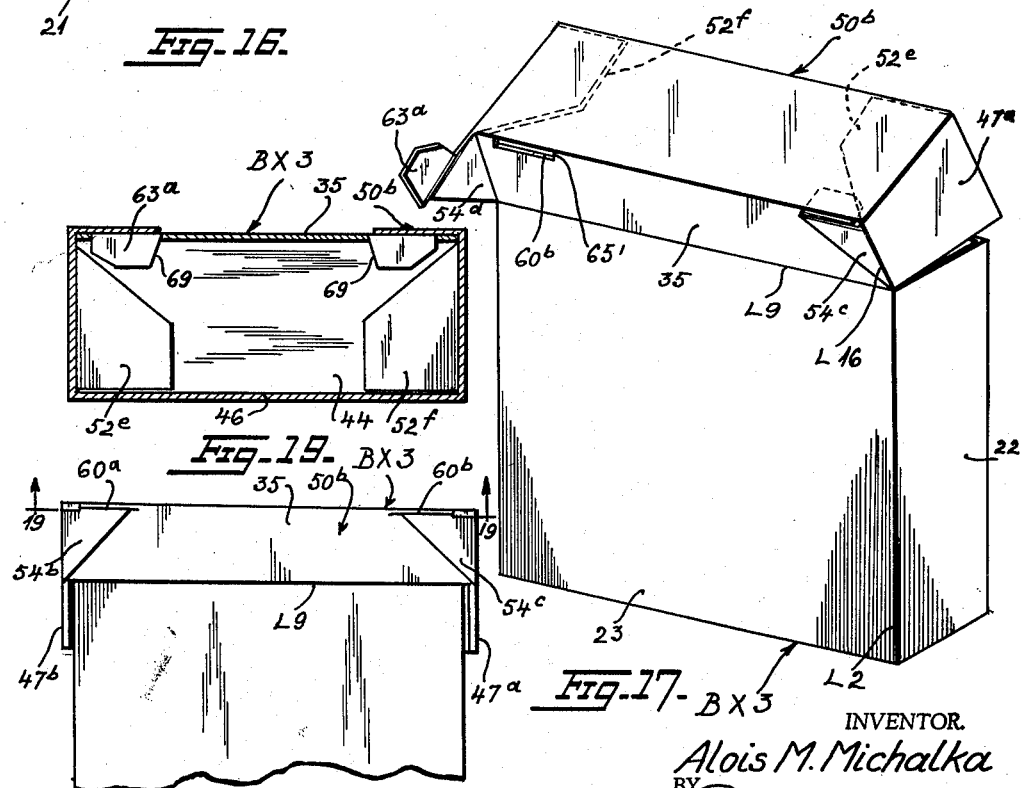
Fig. 19.
Fig. 17.
Fig. 18.
INVENTOR.
Alois M. Michalka
BY Polachek & Saulsbury
ATTORNEYS.

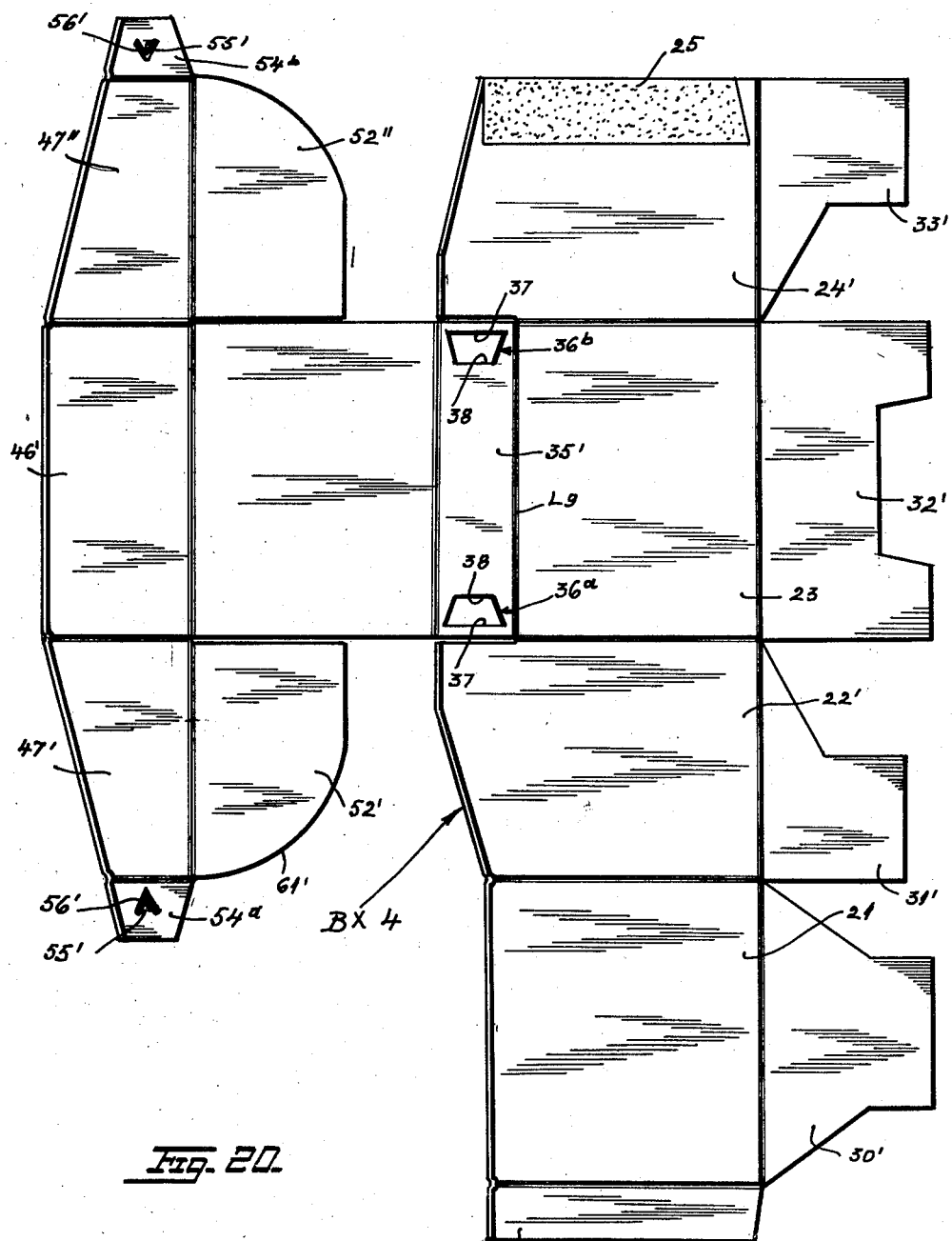

United States Patent Office 3,182,889
Patented May 11, 1965

3,182,889
FOLDING BOX
Alois M. Michalka, Rte. 6A, Portland, Conn.
Filed Aug. 15, 1963, Ser. No. 302,305
12 Claims. (Cl. 229—44)

This invention concerns a folding box construction with hinged cover, and involves a die-cut blank used in forming the box.

The invention is particularly directed at an improved arrangement of interlocking sections for the top or cover of the box. The use of adhesive in assembling the top of the box is avoided. According to the invention, the folding box is made from a single blank with bottom flaps which interlock in a known fashion to form a closed bottom end. The top of the box is hinged to a rectangular body portion. This hinged top includes side panels with horizontally folded flaps which fit under a horizontal top panel. Tabs are provided at ends of the side panels. These tabs extend around a rear panel of the body where two die-cut openings are provided. The tabs include struck out tongues which engage on vertical edges of the openings inside the body of the box while ends of the tabs extend into the openings. The tabs are thus locked or anchored in place and in turn they hold the side panels and upper flaps in place.

In another form of the invention the hinged top is provided with side panels, horizontal top flaps and tabs which extend around to the rear of the box top. Horizontal extensions are provided on the tabs. These tab extensions engage in horizontal slots formed at the upper edge of the rear panel and thus anchor the tabs in place. The anchored tabs in turn hold the side panels and upper flaps in place.

It is therefore a principal object of the invention to provide an improved means for anchoring panels and flaps of a hinged box top.

Another object is to provide a die-cut blank for forming a hinged box top, in which the blank includes tabs adapted to enter openings or slots formed in a rear panel of the box top.

A further object is to provide an improved folding box construction, in which the box has a hinged top formed with improved locking tabs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front view of a box embodying the invention, the box top being shown in partially open position.

FIG. 2 is a vertical sectional view taken on line 2—2 of FIG. 1.

FIG. 3 is a horizontal cross-sectional view taken on line 3—3 of FIG. 1.

FIG. 4 is a bottom plan view taken on line 4—4 of FIG. 1.

FIG. 5 is a side elevational view of the partially open box of FIG. 1.

FIG. 6 is a perspective view of the partially open box.

FIG. 7 is a rear elevational view of the box with top closed.

FIG. 8 is a horizontal sectional view taken on line 8—8 of FIG. 7 and showing the underside of the closed top of the box.

FIG. 9 is a fragmentary rear cross-sectional view taken on line 9—9 of FIG. 5.

FIG. 11 is a plan view of another die-cut blank for forming another box according to the invention.

FIG. 12 is a front view of a partially open box made from the blank of FIG. 11.

FIG. 13 is a perspective view of a partially set-up open box made from the blank of FIG. 11.

FIG. 14 is a rear elevational view of a closed box made from the blank of FIG. 11.

FIG. 15 is a cross-sectional view taken on line 15—15 of FIG. 14 showing the underside of the top of the box.

FIG. 16 is a plan view of part of another blank for forming another box according to the invention.

FIG. 17 is a perspective view of a partially set up, open box made from the blank of FIG. 16.

FIG. 18 is a fragmentary rear elevational view of the closed box made from the blank of FIG. 16.

FIG. 19 is a cross-sectional view taken on line 19—19 of FIG. 18, showing the underside of the top of the box.

FIG. 20 is a plan view of a blank for forming another box.

Figure 10:
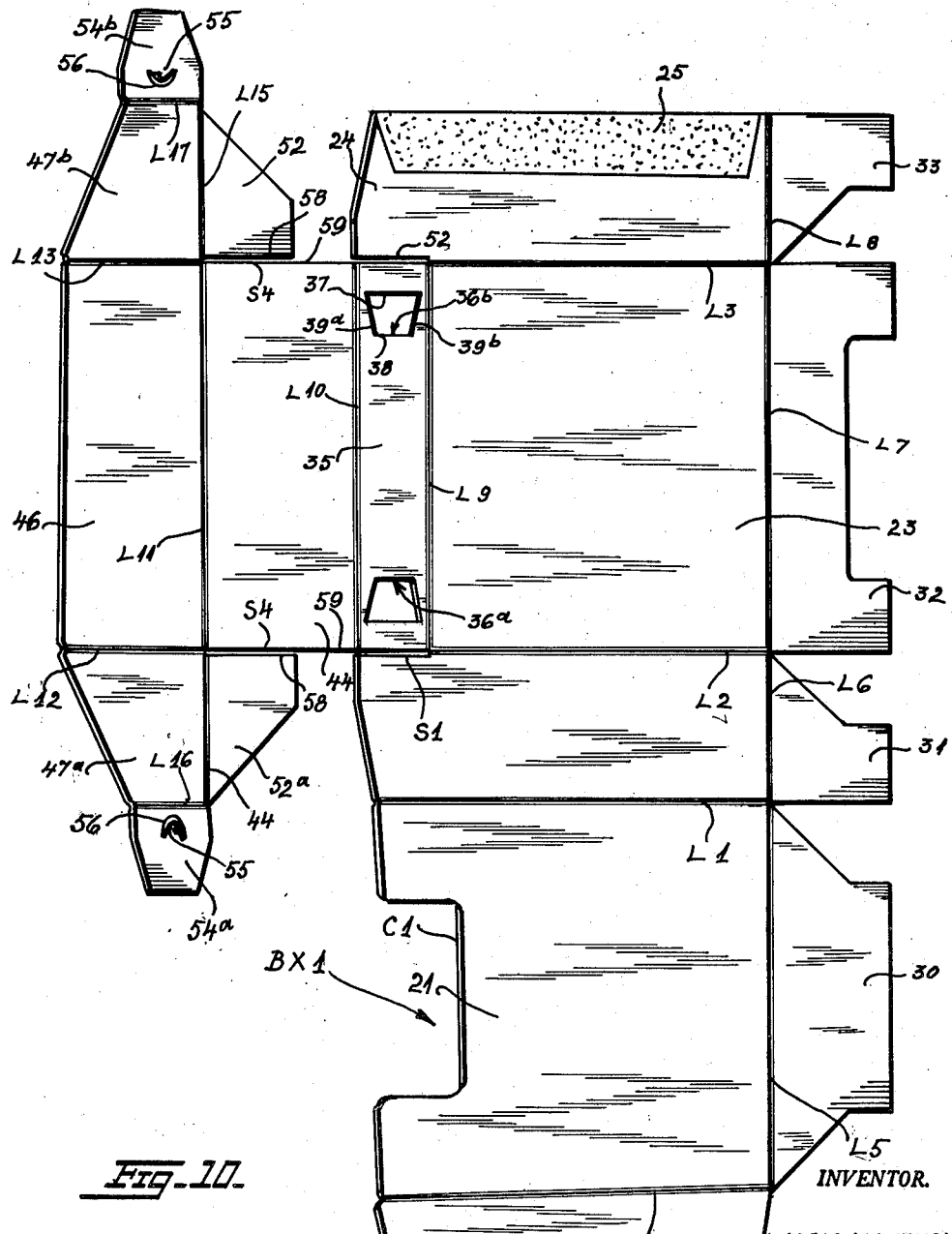
FIG. 10 is a plan view of a die-cut blank from which the box of FIGS. 1–9 is made.

Referring first to FIG. 10, there is shown a blank BL1 die-cut from a single sheet of pliable cardboard, pasteboard or Bristol board. The blank has four generally rectangular panels 21–24 joined by vertical fold lines L1–L3. These panels form the four sides of the box BX1 shown in FIGS. 1–9. Panel 21 with upper cutout C1 forms the front side. Panel 23 forms the rear side. Panel 22 forms the right side viewed from the front and panel 24 forms the left side viewed from the front. A suitable adhesive or gum 25 is applied to the right margin of panel 24. This adhesive engages a narrow flap 26 extending to the left of panel 21 and provided with a fold line L4 so that flap 26 folds inwardly of the panel 24 at the right of the set-up box.

Four flaps 30–33 extend downwardly from panels 21–24, respectively, and are provided with transverse or horizontal fold lines L5–L8. The flaps 30–33 interlock to form a closed bottom for the box as clearly shown in FIGS. 2–4.

Extending upwardly from panel 23 which forms the rear side of the body of the box is a narrow rectangular panel 35. The panel is cut loose from adjacent panels 22 and 24 by slits S1, S2 at opposite ends of panel 35. Formed in the panel 35 near opposite ends thereof are generally trapezoidal openings 36$^a$, 36$^b$. Each opening has an outer longer vertical edge 37 and a shorter inner vertical edge 38 with upper and lower inclined edges 39$^a$, 39$^b$. Panel 35 is connected to panel 23 by a horizontal fold L9. Connected to panel 35 by another horizontal fold L10 is a rectangular panel 44 which forms the uppermost side of the box.

Attached to panel 44 by a fold L11 is another rectangular panel 46. This panel forms the front side of the hinged top or cover 50 of the box as shown in FIGS. 1, 2 and 5. The cover 50 is attached to the body of the box by panel 35 which serves as a hinge with upper and lower folds L10 and L9, respectively.

Attached to opposite ends of panel 44 by vertical folds L12, L13 are two tapered wing panels 47$^a$, 47$^b$ which form left and right sides of the cover 50 as viewed from the front of the box BX1. Two trapezoidal flaps 52$^a$, 52$^b$ are attached to lower edges of panels 46$^a$, 46$^b$ by folds L14, L15.

Two tapered tabs 54$^a$, 54$^b$ extend outwardly of outer ends of panels 47$^a$, 47$^b$ and are attached by folds L16, L17. Two generally U-shaped or V-shaped tongues 55 are formed in the tabs by U-shaped or V-shaped slits 56. The apices of the tongues and slits are located near vertical folds L16, L17.

Edges 58 of the flaps 52$^a$, 52$^b$ are cut loose from adjacent edges 59 of panel 44 by slits S4 so that these flaps can be folded inwardly underneath the panel 44 in the set-up cover 50; see FIG. 8. When the cover 50 is formed, tabs 54$^a$, 54$^b$ are folded around the back of panel 35 as shown in FIGS. 4, 6 and 7. The narrow ends of the tabs are inserted inside of the openings 36$^a$, 36$^b$ just beyond the shorter inner edges 38 of the openings. The tongues 55 engage inside of panel 35 at the longer edges 37 of the openings. This arrangement insures that the tabs are anchored at rear panel 35; that the sides 47$^a$, 47$^b$ remain perpendicular to the front and rear panels 46, 35; and that the flaps 52$^a$, 52$^b$ remain in place under the top panel 44.

In FIG. 11 is shown blank BL2 which is similar to blank BL1 and corresponding parts are identically numbered. Blank BL2 has horizontal slits 60$^a$, 60$^b$ formed in rear panel 35 at fold L10. These slits are located near opposite ends of panel 35. The openings 36$^a$, 36$^b$ of blank BL1 are omitted. Flaps 52$^c$, 52$^d$ which depend from tapered wing panels 47$^a$, 47$^b$, respectively, have rounded corners 61 in place of the obtuse angled corners in the flaps 52$^a$, 52$^b$ of blank BL1. Generally triangular tabs 54$^c$, 54$^d$ extend outwardly from ends of panels 47$^a$, 47$^b$, respectively. At lower edges of the tabs are generally rectangular tab extensions 63 joined to the tabs by folds L18, L20.

Box BX2 shown in FIGS. 12–15 is set up from blank BL2. The bottom flaps 30–33 interlock to form a closed bottom for the rectangular body of the box. The panels 21–24 form the sides of the body of the box. The open top of the box is closed by cover 50$^a$ which is hinged to the rear panel 23 by fold L9 of rear panel 35. The slits 60$^a$, 60$^b$ may be formed with vertically extending outer portions 65 to facilitate insertion of rectangular tab extensions 63 into the respective slits. The tab extensions extend horizontally forward underneath and parallel to top panel 44 of the cover. The tab extensions may underlay flaps 52$^c$, 52$^d$ as shown in FIGS. 12, 15 while the triangular tabs 54$^c$, 54$^d$ are juxtaposed to upper corners of panel 35; see FIGS. 13 and 14. The cover is held in set-up form by the engagement of the tab extensions in the slits 60$^a$, 60$^b$. This holds tabs 54$^c$, 54$^d$ against the rear panel 35 and holds side panels 47$^a$, 47$^b$ vertical and perpendicular to the top panel 44. At the same time, the front panel 46 is held perpendicular to the top and side panels, by the engagement of flaps 52$^c$, 52$^d$ under the top panel 44 in cooperation with the engagement of the tab extensions in slits 60$^a$, 60$^b$.

In FIG. 16 is shown blank BL3 which is substantially identical to blank BL2, except that slits 60$^a$, 60$^b$ are formed with slightly turned up ends 65'. Also tab extension 63$^a$ have short straight inner edges 67 and longer straight outer edges 67 which are included inwardly toward the central line of symmetry of the blank. Flaps 52$^e$, 52$^f$ are trapezoidal in form like flaps 52$^a$, 52$^b$ of blank BL1. Other parts of blank BL3 are the same as those of blank BL2 and are identically numbered.

Blank BL3 is used to form set-up box BX3 shown in FIGS. 17, 18 and 19. Triangular tabs 54$^c$, 54$^d$ are juxtaposed to the rear panel 35 of box cover 50$^b$ and tab extensions 63$^a$ are inserted through slits 60$^a$, 60$^b$ coplanar with flaps 52$^e$, 52$^f$. Other parts of the body of the box are the same as box BX2 and corresponding parts are identically numbered. The upturned ends 65' of the slits 60$^a$, 60$^b$ and the inclined outer edges 69 of the tab extensions facilitate insertion of the tab extensions into the slits. The cover 50$^b$ is held in set-up position by the flaps 52$^e$, 52$^f$ underlaying top panel 44 and by the tab extensions engaged in the slits 60$^a$, 60$^b$.

In FIG. 20 is shown blank BL4 which is similar to blank BL1 and is used to set up a box which is wider from front to back than box BX1. Blank BL4 has openings 36$^a$, 36$^b$ in rear hinge panel 35' for receiving tabs 54$^a$, 54$^b$, respectively, as explained in connection with blank BL1. Slits 56' in the tabs are V-shaped and the tongues 55' are correspondingly triangular. Flaps 52', 52'' are longer and wider than flaps 52$^a$, 52$^b$ of blank BL1 and have rounded corners 61'. Front panel 46' is wider than panel 46, and panels 22', 24' are wider than panels 22 and 24 of blank BL1. The bottom flaps 30'–33' are also wider respectively than flaps 30–33, and cover panel 44' is wider than panel 44. Panels 47' and 47'' are longer than panels 47$^a$, 47$^b$.

Figure 21:
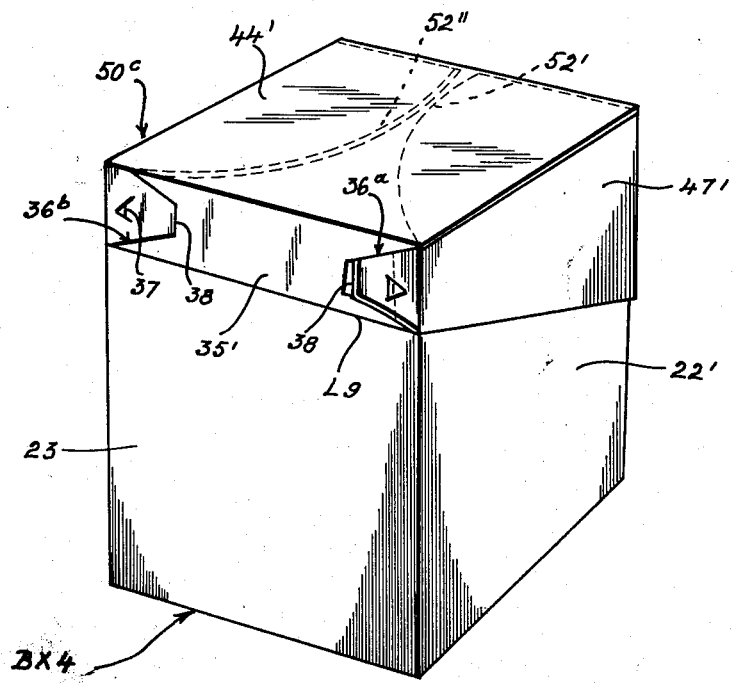
FIG. 21 is a perspective view of a box set up from the blank of FIG. 20.

The arrangement of blank BL4 results in a wider box BX4 from front to back, as shown in FIG. 21, than the narrower box BX1 of FIGS. 1–9. The triangular tongues 55' engage inside of straight edges 37 of the openings 36$^a$, 36$^b$ and the free ends of the tabs enter the openings and are disposed just beyond shorter edges 38 of the openings. Flaps 52', 52'' fit under the top panel 44' and the entire cover 50$^c$ is held in set-up arrangement by the cooperative engagement of the flaps under the panel 44 and the anchoring of the tabs on the edges of the holes in rear panel 35'.

There has thus been provided a variety of die-cut one-piece paper or cardboard blanks, each of which can be used to set up a rectangular box with a hinged cover over an open top body to close the same. The box can be used as a container for sundry articles such as smokers' articles, drug supplies and accessories, etc. The hinged cover opens fully to permit complete access to the interior of the rectangular body of the box. The cover remains in set-up arrangement by the interlocking of tabs or tab extensions in openings or slots in the rear panel of the cover, and by disposition of flaps extending laterally inward from side panels of the cover underneath the top panel of the cover. No adhesive and no fastening elements such as staples are required to secure the cover panels together. Once it is set up, the entire box including the body and cover remain in the set-up form.

The blanks BL1–BL4 can be shipped in flat unfolded form, or if desired, the narrow panels 26 can be pasted to the edges of panels 24, 24' to form a tubular open-ended structure. This open-ended tubular structure can be packed and shipped in flattened form. Later the flattened, knocked down boxes can be set up as shown in the drawings of boxes BX1–BX4.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a folding box having a rectangular body formed by four vertical walls joined by vertical folds and a closed bottom formed by interlocking flaps joined to bottom ends of the vertical walls, a hinged cover comprising a horizontal rectangular top panel, a rear panel depending from the rear edge of the top panel and perpendicular thereto, said rear panel being hinged at its lower edge to an upper edge of one of the walls of said body, a front panel depending from the front edge of the top panel perpendicular thereto and parallel to the rear panel, a pair of side panels attached to opposite ends of the front panel and extending rearwardly parallel to each other and perpendicular to the top panel, a pair of flaps extending laterally inward from upper edges of the side panels and underlaying the top panel, tabs extending laterally inwardly of rear ends of the side panels and juxtaposed to opposite ends of the rear panel, and means at said rear panel engaging said tabs and anchoring the same so that the rear, side and front panels remain in rectangular array perpendicular to the top panel.

2. In a folding box having a rectangular body formed by four vertical walls joined by vertical folds and a closed bottom formed by interlocking flaps joined to bottom ends of the vertical walls, a hinged cover comprising a horizontal rectangular top panel, a rear panel depending from the rear edge of the top panel and perpendicular thereto, said rear panel being hinged at its lower edge to an upper end of one of the walls of said body, a front panel depending from the front edge of the top panel perpendicular thereto and parallel to the rear panel, a pair of side panels attached to opposite ends of the front panel and extending rearwardly parallel to each other and perpendicular to the top panel, a pair of flaps extending laterally inward from upper edges of the side panels and underlaying the top panel, tabs extending laterally inwardly of rear ends of the side panels and juxtaposed to opposite ends of the rear panel, said rear panel having openings formed near opposite ends thereof, said tabs engaging in said openings and thereby anchoring the tabs at the rear panel so that the rear, side and front panels remain in rectangular array perpendicular to the top panel.

3. In a folding box having a rectangular body formed by four vertical walls joined by vertical folds and a closed bottom formed by interlocking flaps joined to bottom ends of the vertical walls, a hinged cover comprising a horizontal rectangular top panel, a rear panel depending from the rear edge of the top panel and perpendicular thereto, said rear panel being hinged at its lower edge to an upper end of one of the walls of said body, a front panel depending from the front edge of the top panel perpendicular thereto and parallel to the rear panel, a pair of side panels attached to opposite ends of the front panel and extending rearwardly parallel to each other and perpendicular to the top panel, a pair of flaps extending laterally inward from upper edges of the side panels and underlaying the top panel, tabs extending laterally inwardly of rear ends of the side panels and juxtaposed to opposite ends of the rear panel, said rear panel having openings formed near opposite ends thereof, said tabs engaging in said openings, each of said tabs having a struck out tongue engaged inside of one edge of one of the openings, so that the tabs are anchored at the rear panel and so that the rear, side and front panels remain in rectangular array perpendicular to the top panel.

4. In a folding box having a rectangular body formed by four vertical walls joined by vertical folds and a closed bottom formed by interlocking flaps joined to bottom ends of the vertical walls, a hinged cover comprising a horizontal rectangular top panel, a rear panel depending from the rear edge of the top panel and perpendicular thereto, said rear panel being hinged at its lower edge to an upper end of one of the walls of said body, a front panel depending from the front edge of the top panel perpendicular thereto and parallel to the rear panel, a pair of side panels attached to opposite ends of the front panel and extending rearwardly parallel to each other and perpendicular to the top panel, a pair of flaps extending laterally inward from upper edges of the side panels and underlaying the top panel, tabs extending laterally inwardly of rear ends of the side panels and juxtaposed to opposite ends of the rear panel, said rear panel having narrow slotted openings horizontally disposed in alignment at an upper edge of the rear panel, each of said tabs having an extension hinged thereto by a fold, the extensions of the tabs extending through said slotted openings respectively to underlay the top panel, so that the tabs are anchored at the rear panel and so that the rear, side and front panels remain in rectangular array perpendicular to the top panel.

5. In a folding box having a rectangular body formed by four vertical walls joined by vertical folds and a closed bottom formed by interlocking flaps joined to bottom ends of the vertical walls, a hinged cover comprising a horizontal rectangular top panel, a rear panel depending from the rear edge of the top panel and perpendicular thereto, said rear panel being hinged at its lower edge to an upper end of one of the walls of said body, a front panel depending from the front edge of the top panel perpendicular thereto and parallel to the rear panel, a pair of side panels attached to opposite ends of the front panel and extending rearwardly parallel to each other and perpendicular to the top panel, a pair of flaps extending laterally inward from upper edges of the side panels and underlaying the top panel, tabs extending laterally inwardly of rear ends of the side panels and juxtaposed to opposite ends of the rear panel, said rear panel having openings formed near opposite ends thereof, said tabs engaging in said openings, each of said tabs having a struck out tongue engaged inside of one edge of one of the openings, so that the tabs are anchored at the rear panel and so that the rear, side and front panels remain in rectangular array perpendicular to the top panel, each of said tongues being generally V-shaped to engage securely at edges of the openings.

6. A hinged cover for a folding box, comprising a rectangular horizontal top panel, a rectangular rear panel depending from the rear edge of the top panel, a rectangular front panel depending from the front edge of the top panel, a pair of generally trapezoidal side panels attached to opposite ends of the front panel and extending rearwardly perpendicularly to the top panel at opposite lateral edges thereof, a pair of flaps extending laterally inward from upper edges of the side panels and underlaying the top panel, and tabs extending laterally inwardly of rear ends of the side panels and juxtaposed to the opposite ends of the rear panel, and means at said rear panel engaging said tabs and anchoring the same, so that the rear, side and front panels remain in fixed, rectangular array perpendicular to the top panel.

7. A hinged cover for a folding box, comprising a rectangular horizontal top panel, a rectangular rear panel depending from the rear edge of the top panel, a rectangular front panel depending from the front edge of the top panel, a pair of generally trapezoidal side panels attached to opposite ends of the front panel and extending rearwardly perpendicularly to the top panel at opposite lateral edges thereof, a pair of flaps extending laterally inward from upper edges of the side panels and underlaying the top panel, and tabs extending laterally inwardly of rear ends of the side panels and juxtaposed to the opposite ends of the rear panel, said rear panel having openings formed near opposite ends thereof, said tabs engaging in said openings and thereby anchoring the tabs at the rear panel, so that the rear, side and front panels remain in fixed rectangular array perpendicular to the top panel.

8. A hinged cover for a folding box, comprising a rectangular horizontal top panel, a rectangular rear panel depending from the rear edge of the top panel, a rectangular front panel depending from the front edge of the top panel, a pair of generally trapezoidal side panels attached to opposite ends of the front panel and extending rearwardly perpendicularly to the top panel at opposite lateral edges thereof, a pair of flaps extending laterally inward from upper edges of the side panels and underlaying the top panel, and tabs extending laterally inwardly of rear ends of the side panels and juxtaposed to the opposite ends of the rear panel, said rear panel having openings formed near opposite ends thereof, said tabs engaging in said openings, each of said tabs having a struck out generally triangular tongue engaged inside of one edge of one of the openings, so that the tabs are anchored at the rear panel, and so that the rear, side and front panels remain in fixed rectangular array perpendicular to the top panel.

9. A hinged cover for a folding box, comprising a rectangular horizontal top panel, a rectangular rear panel depending from the rear edge of the top panel, a rectangular front panel depending from the front edge of the top panel, a pair of generally trapezoidal side panels attached to opposite ends of the front panel and extending rearwardly perpendicularly to the top panel at opposite lateral edges thereof, a pair of flaps extending laterally inward from upper edges of the side panels and underlaying the top panel, and tabs extending laterally inwardly of rear ends of the side panels and juxtaposed to the opposite ends of the rear panel, said rear panel having horizontally spaced narrow slotted openings at an upper edge of the rear panel near opposite ends thereof, each of said tabs having a generally rectangular extension disposed perpendicular to the remainder of the tab and inserted through the slotted openings respectively to underlay the top panel, so that the tabs are anchored at the rear panel, and so that the rear, side and front panels remain in fixed rectangular array perpendicular to the top panel.

10. A blank for forming a folding box, comprising a plurality of rectangular sections joined by folds to form side, front and rear walls of a body of said box, flaps joined by other folds to lower ends of said sections for interlocking to form a closed bottom for the box, another rectangular section extending outwardly of an upper edge of that one of the first-named sections which forms the rear wall, said other section being divided into three rectangular portions by further folds for forming respectively rear, top, and front panels of a cover hinged to said rear wall, a pair of wing panels extending laterally of opposite ends of the outermost one of said three portions for forming opposing sides of the cover, a pair of other flaps depending from lower ends of the wing panels for forming anchoring means to underlay the top of the cover, the innermost one of said three portions which forms the rear panel of the cover having spaced openings therein near opposite ends thereof, and tabs extending outwardly of ends of said wing panels for engaging in said openings to lock the front, rear and side wing panels in a rectangular array fixed with respect to the top panel.

11. A blank for forming a folding box, comprising a plurality of rectangular sections joined by folds to form side, front and rear walls of a body of said box, flaps joined by other folds to lower ends of said sections for interlocking to form a closed bottom for the box, another rectangular section extending outwardly of an upper edge of that one of the first-named sections which forms the rear wall, said other section being divided into three rectangular portions by further folds for forming respectively rear, top, and front panels of a cover hinged to said rear wall, a pair of wing panels extending laterally of opposite ends of the outermost one of said three portions for forming opposing sides of the cover, a pair of other flaps depending from lower ends of the wing panels for forming anchoring means to underlay the top of the cover, the innermost one of said three portions which forms the rear panel of the cover having spaced openings therein near opposite ends thereof, and tabs extending outwardly of ends of said wing panels for engaging in said openings to lock the front, rear and side wing panels in a rectangular array fixed with respect to the top panel, said openings having opposing edges, said tabs each having a struck-out integral tongue for engaging on one of the edges of an opening while the free end of the tab engages at the opposite edge of the opening.

12. A blank for forming a folding box, comprising a plurality of rectangular sections joined by folds to form side, front and rear walls of a body of said box, flaps joined by other folds to lower ends of said sections for interlocking to form a closed bottom for the box, another rectangular section extending outwardly of an upper edge of that one of the first-named sections which forms the rear wall, said other section being divided into three rectangular portions by further folds for forming respectively rear, top, and front panels of a cover hinged to said rear wall, a pair of wing panels extending laterally of opposite ends of the outermost one of said three portions for forming opposing sides of the cover, a pair of other flaps depending from lower ends of the wing panels for forming anchoring means to underlay the top of the cover, the innermost one of said three portions which forms the rear panel of the cover having spaced openings therein near opposite ends thereof, and tabs extending outwardly of ends of said wing panels for engaging in said openings to lock the front, rear and side wing panels in a rectangular array fixed with respect to the top panel, said openings being narrow, aligned slots, said tabs having generally rectangular extensions for engaging in said slots respectively.

No references cited.

FRANKLIN T. GARRETT, *Primary Examiner.*